Patented June 29, 1926.

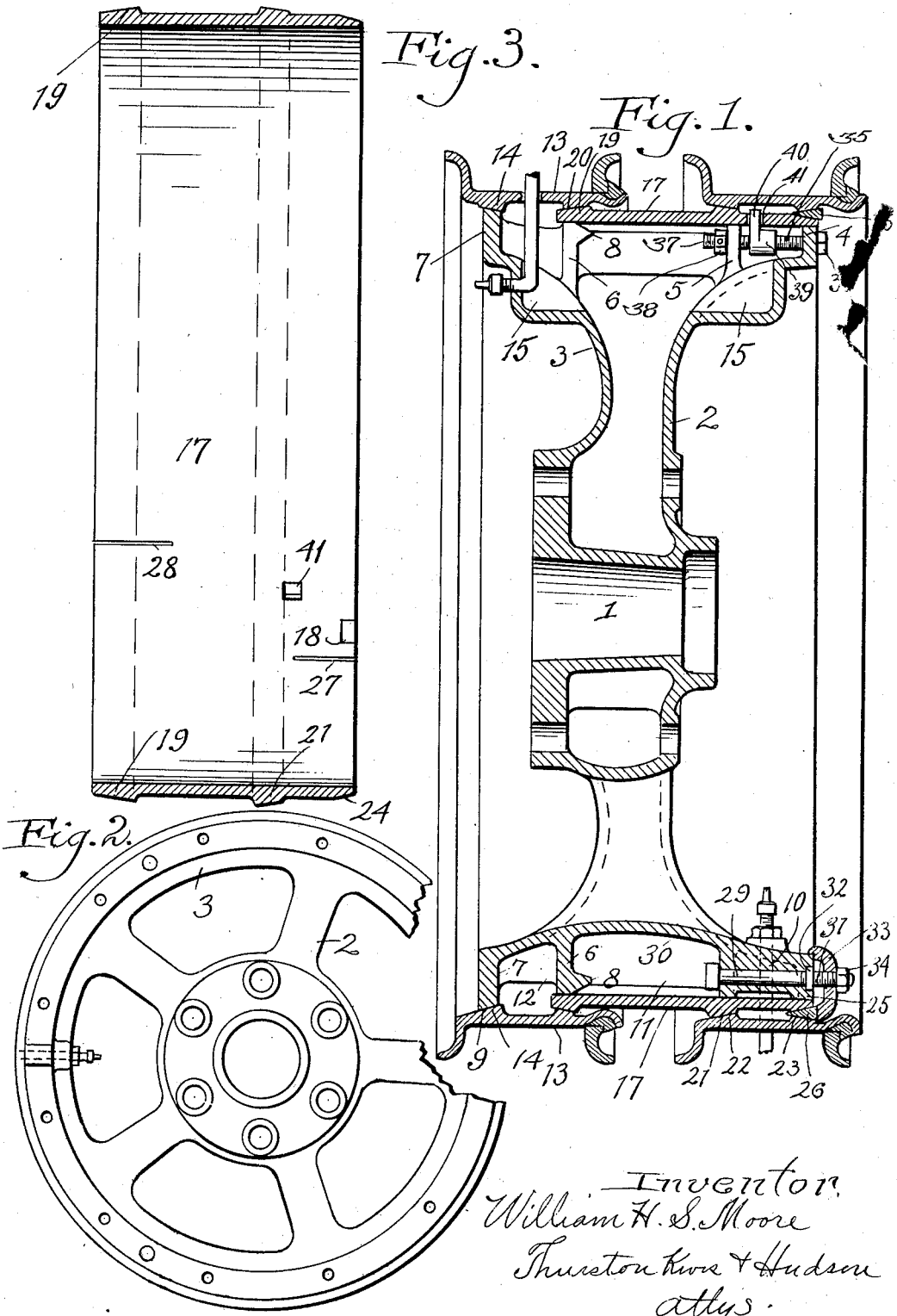

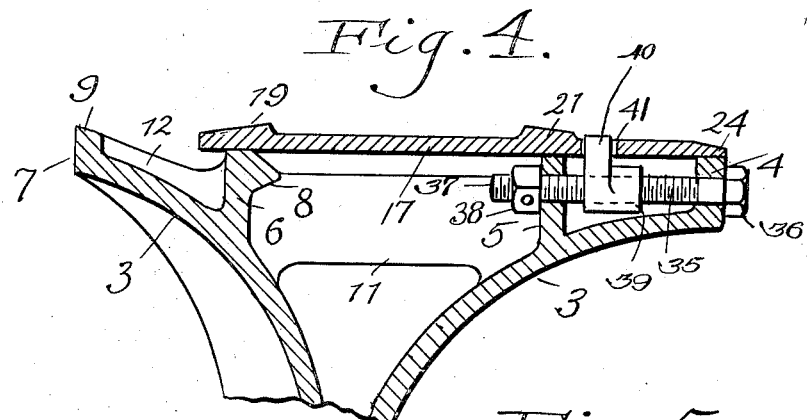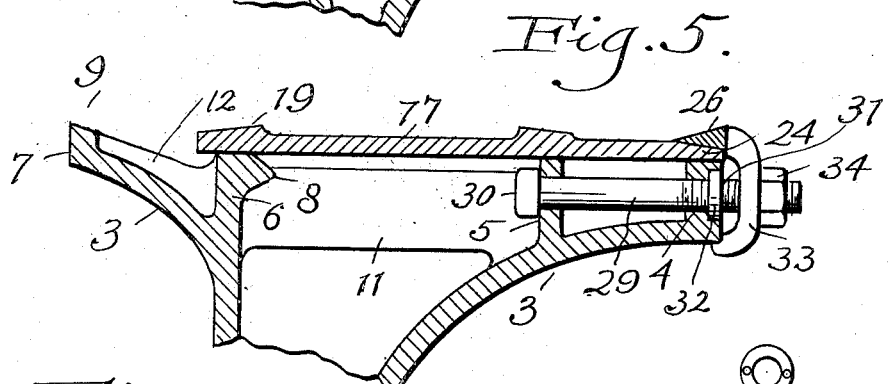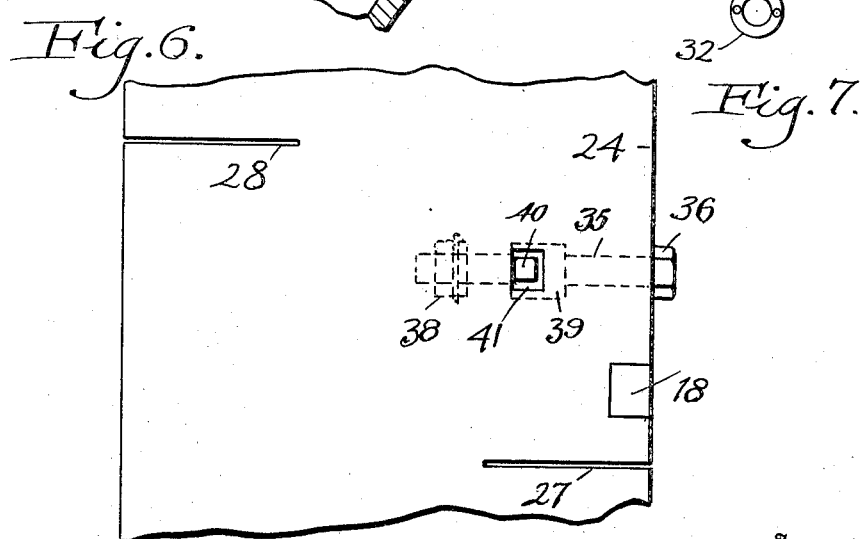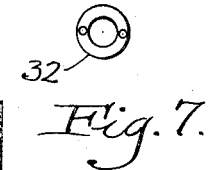

1,590,774

UNITED STATES PATENT OFFICE.

WILLIAM H. S. MOORE, OF CLEVELAND, OHIO.

MOTOR-VEHICLE WHEEL.

Application filed October 20, 1923. Serial No. 669,645.

This invention relates to motor vehicle wheels of the demountable rim type, and more particularly to wheels of the type in which two demountable rims for pneumatic tires are mounted side by side upon the felloe portion of the wheel, such wheels being commonly used for the driving wheels of heavy motor vehicles such as trucks and busses.

One of the main objects of the present invention is to provide means whereby one or both rims can be easily and quickly removed for the replacement or repair of tires.

A further object is to provide means for clamping the rims upon the wheel by which both rims may be very rigidly clamped in place.

A further object is to provide an easily removable felloe band which serves both as a clamping member for the inner rim and as a mounting member for the outer rim.

A further object is to provide a removable felloe band which may be rigidly clamped to the felloe portion of the wheel but which is readily removable therefrom.

A further object is to provide separate means accessible from the outer side of the wheel for tightening the wedge clamps of the two rims.

A further object is to provide clamping bolts which are rigidly held against longitudinal movement in the felloe regardless of whether the clamping nuts thereon are loose or tight.

Other objects will be apparent from the following description and accompanying drawings.

The following description and accompanying drawings set forth in detail certain means embodying the invention, the disclosed means, however, constituting but one of the various mechanical forms in which the principle of the invention may be employed.

Reference should be had to the accompanying drawings forming a part of this specification in which Fig. 1 is an axial transverse section through the wheel; Fig. 2 is a side elevation of the wheel; Fig. 3 is an axial transverse section through the felloe band; Fig. 4 is a fragmentary sectional view showing the felloe band tightener; Fig. 5 is a fragmentary sectional view showing the wedge ring tightening means; Fig. 6 is a fragmentary plan view of a portion of the felloe band; Fig. 7 is a detail view of the clamp bolt retaining washer.

The present invention has been illustrated in connection with a wheel of the hollow cast steel type, this being a type of wheel commonly used in heavy motor vehicles. The invention, however, relates to the mounting of the tire carrying rims upon the wheel regardless of the particular construction of the body of the wheel.

Referring to the accompanying drawings, the body of the wheel consists of a hub portion 1 with integral hollow spokes 2 which radiate therefrom flaring outwardly toward their outer ends and merging into the continuous felloe portion 3. The felloe portion 3 is formed by a series of outwardly extending circumferential ribs, the ribs 4 and 5 at the outer side of the wheel being of substantially the same diameter. At the inner side of the felloe portion there are two outwardly extending ribs 6 and 7, the rib 6 being of substantially the same diameter as the ribs 4 and 5 while the rib 7 forming the inner face of the felloe is extended to a larger diameter. The rib 6 has on the side thereof toward the outer side of the wheel a laterally projecting lip 8 which has a tapered outer face which serves to guide the inner rim and the felloe band into place when they are being assembled upon the wheel. The inner rib 7 has a peripheral edge portion 9 which tapers toward the outer side of the wheel and forms the inner seat for the inner demountable rim. The felloe portion 3 is reinforced by transverse ribs formed at suitable intervals between the outwardly extending rims. The transverse webs or ribs 10 extending between the ribs 4 and 5, the transverse ribs or webs 11 extending between the ribs 5 and 6 and the transverse ribs or webs 12 extending between the ribs 6 and 7. The inner demountable rim 13 has a wedge rib or thickened portion 14 which bears against the tapered edge portion 9 of the inner flange or rib 7. In order to permit the inner rim 13 to be moved to the inner side of the felloe portion, a transverse channel 15 is formed in the felloe portion 3 at the outer end of one of the spokes 2 and the ribs 5 and 6 are slotted so that the angle valve stem 16 of the inner rim can be inserted in the channel adjacent the outer side of the felloe and can be shifted laterally across the outer end of the hollow spoke to its final position in the felloe, the channel 15 providing a passage for the valve stem of the inner tire without weakening the felloe.

Encircling the felloe portion 3 and bearing upon the peripheries of the ribs 4, 5 and 6 is a continuous felloe band 17 which has a suitable lug 18 on its inner face at the outer edge thereof engaging in a notch in the rib 4 to prevent circumferential movement of the felloe band with respect to the felloe. Along its inner edge the felloe band 17 has a thickened wedge portion 19, the outer face of which tapers toward the inner side of the wheel and engages with a tapered rib or thickened portion 20 upon the interior of the inner rim 13.

It will be apparent that if the felloe band 17 be forced toward the inner side of the wheel that a radial outward pressure will be exerted upon the rim 13 firmly clamping the rim between the tapered seat 9 and the tapered wedge portion 19 of the felloe band.

The felloe band has an intermediate circumferential thickened portion 21, the outer face of which tapers toward the outer side of the wheel and is engaged by the inner tapered rib 22 of the outer demountable rim 23. The outer edge portion 24 of the felloe band when the band is assembled on the wheel is substantially flush with the outer side face of the felloe and has its outer face tapering toward the outer side of the wheel. The outer wedge rib 25 of the demountable rim has its inner face formed with a taper opposite that of the edge portion 24 of the felloe band and a wedge clamping ring 26 is interposed between the tapered edge 24 of the felloe band and the tapered rib 25 of the rim. It will be obvious that if the wedge ring 26 be forced inwardly the outer rim will be rigidly clamped upon the felloe band between the tapered seat portion 21 thereof and the wedge ring 26.

It is desirable that the felloe band have a tight engagement with the felloe and at the same time be readily removable from the felloe. To accomplish this result I have provided one or more transverse kerfs 27 and 28 extending inwardly from each side of the felloe band toward the center thereof. The kerfs on opposite sides of the band being preferably staggered with respect to each other so as not to unduly weaken the band. The kerfs 27 and 28 render the edge portions of the band sufficiently contractile to enable the edge portions of the band to be contracted sufficiently to firmly grip the felloe. The intermediate portion of the band, however, is rigid and cannot be contracted to smaller diameter. If the felloe band 17 be forced inwardly by applying pressure to the wedge ring 26, the inner wedge portion 19 engaging the endless rim 13 will be forced inwardly into tight gripping engagement with the periphery of the rib 6. At the same time the wedge 26 will force the outer edge portion 24 of the band into tight gripping engagement with the periphery of the rib 4. This contraction of the edge portions of the band, however, does not affect the thickened seat portion 21 thereof, which forms the inner seat for the outer demountable rim. It will be readily seen that by providing a band with contractile edge portions the band may be formed of a sufficient diameter to permit it to be readily slipped over the felloe.

Inward pressure is applied to the wedge ring 26 by means of clamping bolts 29 which extend transversely through the ribs 4 and 5, have squared heads 30 against the inner side of the rib 5, the stem thereof having a threaded portion 31 projecting past the outer face of the rib 4. The bolt heads 30 are each positioned against one of the cross ribs 11 so that the bolt is held against rotation. Each bolt is provided with a round washer 32 threaded on the bolt and screwed down into a counter-bore in the outer face of the felloe, the washer 32 being provided with suitable holes to receive a spanner wrench. Each bolt 29 has a clip 33 on the projecting portion thereof and a nut 34 outside the clip whereby the clip may be forced against the wedge ring 26. The washer 32 serves to rigidly hold the bolt against longitudinal movement regardless of whether the clamp nut 34 is tight or loose, thus the clamping bolts are held rigidly in place even though the nut and clip should work loose and fall off.

While the clamps above described tend to tighten the felloe band and the inner rim as well as the outer rim the frictional binding of the felloe band against the felloe is apt to prevent the exertion of the full clamping pressure upon the inner rim. Furthermore, the loosening of the clamping bolts above described would loosen the inner rim as well as the outer rim. I have therefore provided means separate from and in addition to the clamping means above described for exerting inward pressure upon the felloe band to insure the rigid clamping of the inner rim and to permit the outer rim to be removed when desired without loosening the inner rim. This tightening means consists of a number of equally spaced rotatably mounted bolts 35 which extend through the ribs 4 and 5, the head 36 of the bolt being on the outer side of the rib 4, i. e. on the outer face of the felloe and the threaded portion 37 projecting through the rib 5. Within the rib 5 there is a nut 38 which is screwed down close enough to the rib 5 to prevent any substantial longitudinal movement but not tight enought to prevent rotation of the bolt and pinned to the bolt by a suitable cutter pin. Between the ribs 4 and 5 on the threaded portion of the bolt 35 there is a nut 39 which has an arm 40 which is adapted to be turned into and out of a slot 41 in the felloe band 17. The arm 40 and slot 41 are so disposed with respect to each other that when the bolt 35 is turned in one direction, the arm 40 will swing up into the slot 41 and against an end thereof. Upon continued rotary movement of the bolt in this direction the nut will travel inwardly along the bolt exerting an inward thrust on the band 17. If the bolt 35 be rotated in the opposite direction, the nut 39 as soon as the pressure against the band 17 is relieved will turn with the bolt and carry the arm 40 out of the slot 41 and clear of the band 17 so that it does not interfere with the removal of the band.

Having described my invention, I claim:

1. In a motor vehicle wheel of the double demountable rim type, the combination with the felloe portion of the wheel which has means along its inner edge forming a rim seat, of a felloe band adjustable laterally on the felloe portion toward and from said seating means, said band having means adjacent its inner edge for wedging engagement with the inner rim and other means thereon forming the inner seat for the outer rim, said band extending to the outer edge of the felloe portion and adapted to receive the retaining means for the outer rim.

2. In a motor vehicle wheel of the double demountable rim type, the combination with the felloe portion of the wheel, of an inner demountable rim engaging the felloe portion along the inner edge thereof, a laterally adjustable felloe band having a wedge portion engaging between said inner rim and felloe, said band having an external portion forming a rim seat, an outer demountable rim mounted on said felloe band, retaining means for said outer rim engaging said outer rim and felloe band, and means for exerting pressure inwardly upon said outer rim and felloe band and through said felloe band upon said inner rim.

3. In a motor vehicle wheel of the double demountable rim type, the combination with the felloe portion of the wheel which has along its inned edge a circumferential rim seat along its inner edge of enlarged diameter and tapering toward the other side of the wheel, of a felloe band slidably fitting on the felloe portion and adjustable toward and from the inner rim seat on the felloe portion, said felloe band having two oppositely tapering external circumferential rim seats, one of said seats being along the inner edge of the band and having a taper opposite that of the felloe seat and the other of said seats being spaced outwardly from the first, the outer edge of the felloe band being adjacent the outer edge of the felloe portion and adapted to receive the wedge ring for securing the outer demountable rim in place.

4. In a motor vehicle wheel of the double demountable rim type, the combination with the felloe portion of the wheel which has along its inner edge a circumferential rim seat of enlarged diameter and tapering toward the outer side of the wheel, of an inner demountable rim engaging said seat, a laterally adjustable circumferentially continuous felloe band on the felloe portion of the wheel, said band having an external circumferential rim seat with a taper opposite the rim seat on the felloe portion for engaging said inner demountable rim, said felloe band extending to adjacent the outer side of the wheel, an outer demountable rim, and means for removably securing said outer rim upon said felloe band.

5. In a motor vehicle wheel of the double demountable rim type, the combination with the felloe portion of the wheel which has along its edge, a circumferential rim seat of enlarged diameter and tapering toward the outer side of the wheel, of an inner demountable rim which has a portion in wedging engagement with said seat, a laterally adjustable felloe band fitting on the felloe portion and adapted to apply to or to be removed from said wheel from the outer side thereof, said band having an external circumferential rim seat adjacent its inner edge which has a taper opposite that of the seat on the felloe portion and is adapted to have a wedging engagement with the inner rim, said felloe band having its outer edge adjacent the outer edge of the felloe portion, said band having an external portion forming a rim seat of substantially the same diameter and taper as the seat at the inner edge of the felloe portion, the outer edge portion of the felloe band being tapered outwardly, an outer demountable rim in wedging engagement with the raised seat on the felloe band, a wedge ring seated on the tapered outer edge portion of the felloe band and engaging the outer demountable rim, and means for forcing said wedge ring inwardly.

6. In a motor vehicle wheel of the double demountable rim type, the combination with the felloe portion of the wheel, of an inner demountable rim engaging said felloe portion along the inner edge thereof, laterally adjustable wedging means on the felloe portion in wedging engagement with said inner rim, an outer demountable rim, laterally adjustable wedging means engaging said outer rim, means operable from the outer side of the wheel for forcing the first mentioned wedging means inwardly, and separate means operable from the outer side of the wheel for forcing the second mentioned wedging means inwardly.

7. In a motor vehicle wheel of the double demountable rim type, the combination with the felloe portion of the wheel, of an inner demountable rim engaging the felloe portion along its inner edge, a laterally adjustable felloe band having a wedging engagement with said inner rim, said felloe band extending to the outer side of the felloe portion and having an intermediate rim seating portion, wedging means interposed between the outer edge portion of the band and the outer rim, means for forcing said wedging means inwardly, and separate means for forcing said felloe band inwardly.

8. In a motor vehicle wheel of the double demountable rim type, the combination with the felloe portion of the wheel, of an inner demountable rim engaging said felloe portion along the inner edge thereof, a laterally adjustable felloe band having a raised wedge portion along its inner edge engaging between said inner rim and felloe portion, said band having an intermediate raised outwardly tapering wedge seat and an outwardly tapered edge portion, an outer demountable rim mounted on said band, said rim having a tapered portion engaging said intermediate seat, a wedge ring engaging between the tapered outer edge portion of the band and said outer rim, tightening means for forcing said wedge inwardly to clamp the outer rim to the band, and separate tightening means for forcing the band inwardly to clamp the inner rim.

9. In a motor vehicle wheel of the double demountable rim type, the combination with the felloe portion of the wheel, of a laterally adjustable felloe band on said felloe portion, said felloe band having a raised wedge portion at its inner edge adapted to engage between the felloe portion and inner rim to clamp the rim to the felloe portion, an outer demountable rim mounted on the felloe band, and means for adjusting said felloe band comprising a transversely disposed threaded member rotatably mounted in the felloe portion and having a head on the outer side of the wheel and a nut on said threaded member engaging said band.

10. In a motor vehicle wheel of the double demountable type, the combination with the felloe portion of the wheel, of a felloe band fitting over said felloe portion, said band having a wedge portion along its inner edge engageable with the under side of the inner rim, an intermediate raised portion forming the inner seat for the outer rim and a tapered outer edge portion adapted to receive the wedge ring for clamping the outer rim, said felloe band having kerfs extending inwardly from opposite edges thereof and terminating short of the intermediate seat portion.

11. In a motor vehicle wheel of the double demountable rim type, the combination with the felloe portion of the wheel which has an outwardly tapering inner edge portion forming the inner seat for the inner rim, of a felloe band adjustable laterally on the felloe portion toward and from said seat, oppositely tapering rim seats movable with said band, the inner of said seats forming the outer seat for the inner rim and the outer of said seats forming the inner seat for the outer rim, a laterally adjustable wedging means forming the outer seat for the outer rim, and independent means for adjusting said felloe band and said wedging means.

12. In a motor vehicle wheel of the demountable rim type, a felloe portion, a rim clamping bolt mounted in said felloe portion and extending transversely thereof, said bolt having a head and threaded stem, the threaded stem projecting from one side of the felloe and said felloe portion being provided with a counterbore surrounding the stem, means engaging the head to hold the bolt against rotation, a round washer in threaded engagement with the stem and fitting in the counterbore with its outer surface flush with the side of the felloe, a clip carried by the projecting portion of the stem and a nut outside said clip.

13. In a motor vehicle wheel of the demountable rim type, a felloe portion, a laterally adjustable felloe band on said felloe portion, said band having a slot therein, a threaded member mounted in said felloe portion, extending transversely thereof and held against longitudinal movement, and a nut on said threaded member, said nut having an arm adapted to be moved into the slot in the band and against an end of the slot upon rotation thereof with the threaded member in one direction and to be moved out of the slot and clear of the band upon rotation thereof in the opposite direction.

14. In a motor vehicle wheel, a felloe portion, a felloe band encircling said felloe portion, said band having a rigid center portion and contractile edge portions, and means for simultaneously shifting said band laterally on the felloe portion and contracting said edge portions into gripping engagement with the periphery of the felloe portion.

15. In a motor vehicle wheel of the dual demountable rim type, the combination with the felloe portion of the wheel, means for clamping the inner rim to said felloe portion including a laterally adjustable felloe band having an external raised portion forming a seat for the outer rim and means for clamping the outer rim to said felloe portion, both said rims being removable by movement outwardly on the felloe portion, said clamping means permitting said outer rim to be removed without disturbing the inner rim clamping means.

16. A dual demountable rim truck wheel comprising a body portion having at its periphery inner and outer spaced felloe portions, each having a pair of circumferential spaced ribs, one rib of each pair forming a side of the felloe, the inner ribs being slotted to permit passage laterally of an angle valve stem carried by the inner rim and the rib forming the inner side of the felloe having an opening through which the valve stem is adapted to project.

17. A dual demountable rim truck wheel comprising a body portion having at its periphery a felloe portion, the inner and outer sides of which are continuous, said felloe portion having a transversely extending channel within the side portions adapted to receive the angle valve stem of the inner rim, there being an opening through the inner side of the felloe portion at the inner end of the channel through which the angle valve stem is adapted to project.

In testimony whereof, I hereunto affix my signature.

WILLIAM H. S. MOORE.